May 31, 1927.
A. C. LIPPERT
1,630,269
LOCKING CAP FOR RADIATORS
Filed April 5, 1924
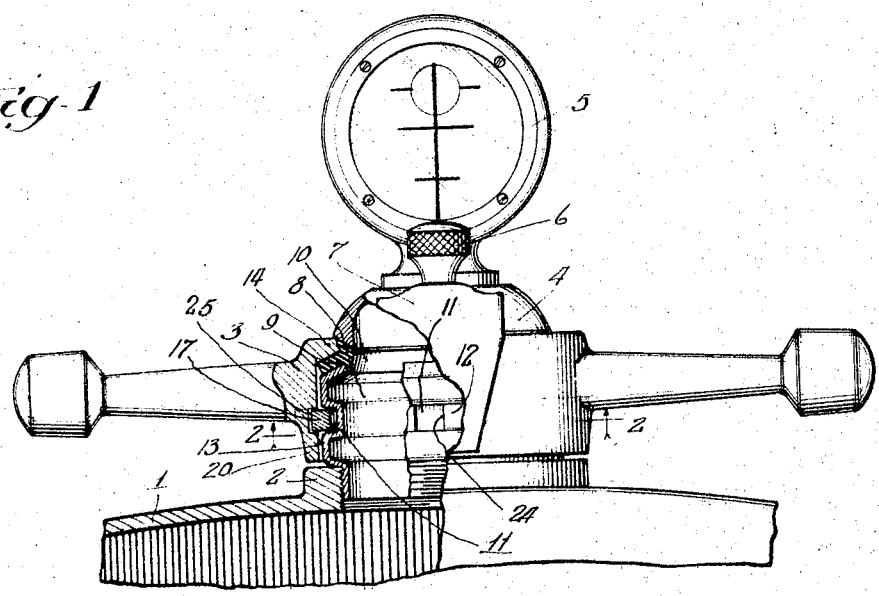
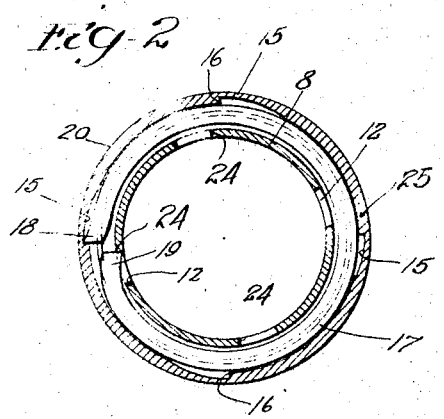
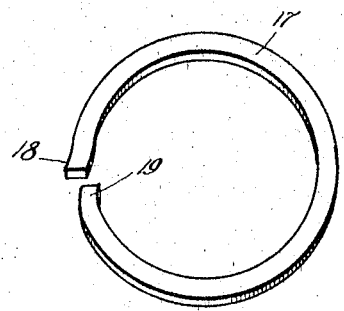
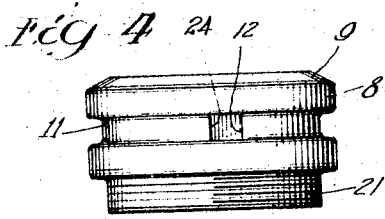
Inventor;
Aloysius C. Lippert
By Munday, Clarke & Carpenter
Attys.

Patented May 31, 1927.

1,630,269

UNITED STATES PATENT OFFICE.

ALOYSIUS C. LIPPERT, OF KENOSHA, WISCONSIN, ASSIGNOR, BY DIRECT AND MESNE ASSIGNMENTS, TO THE NORLIPP COMPANY, OF CHICAGO, ILLINOIS, A CORPORATION OF ILLINOIS.

LOCKING CAP FOR RADIATORS.

Application filed April 5, 1924. Serial No. 704,335.

The invention relates to automobile radiator caps and has for a primary object the provision of means for securely and permanently locking a radiator cap to a radiator neck, said means being efficient and certain of operation and composed of few parts which may be conveniently assembled and economically manufactured.

The invention contemplates the provision of an insert, or internal unit which may be supplied independently of the main cap and which is adapted to be interposed between the inner and outer collar members of the radiator cap when the latter are assembled in such manner as to render the complete cap to be easily threaded onto a radiator neck, and thereafter the cap is positively prevented by the said locking means from being removed or unscrewed from the radiator neck without the use of a special tool.

The characteristics of the improved locking means contemplated by the invention are such that the same may be applied to the inner and outer collar members of the radiator cap with a minimum of alteration in the present structure of the cooperating collar members as adapted for locking means now generally used having the same function and characteristics.

With such objects in view, as well as other objects which are incident to the use of the improvement, the invention consists in the parts and combinations thereof hereinafter set forth and claimed.

In order to make the invention more clearly understood, there are shown in the accompanying drawings means for carrying the same into practical effect, without limiting the improvements, in their useful application, to the particular construction which, for the purpose of explanation, has been made the subject of illustration.

On the drawings,

Figure 1 is a front elevation, partially in section, of a radiator cap in which the invention is embodied, the same being shown positioned upon an automobile radiator;

Fig. 2 is a horizontal section on line 2—2 of Fig. 1;

Fig. 3 is a perspective view of the locking ring; and

Fig. 4 is a side elevation of the internal collar member or adapter.

Referring to the drawings, 1 indicates the radiator of an automobile having the usual screw-threaded filling aperture 2, and 3 is an outer cap member which may be of the well-known bar construction and which is provided with a hinged cover 4, apertured for the reception of a motometer 5 provided with a thumb-screw 6 to maintain the cover in closed position. The cap, as illustrated, also is provided with a projection 7, which may be of keystone form and adapted to receive any suitable decoration or ornamentation. The cap 3 has a centrally apertured hub portion 13, forming an outer depending collar member 20.

An inner collar member, or adapter 8 is provided which is suitably threaded, as at 21, at its lower end for attachment to the internally threaded aperture 2 of the radiator neck and at its upper portion the internal collar is flanged inwardly at 9 to support and have tightly compressed thereagainst the annular gasket or packing 10 when the cover 4 is closed by means of the thumb screw 6. The internal collar member or adapter is provided with an intermediate circumferential groove, or recess 11, the inner wall of which may be cut away at 12 to provide shoulders or abutments 24 at any desired intervals around the circumference of the collar member. As illustrated, four of these abutments are provided in said collar member 8. It will also be apparent that the number of abutments may be increased or decreased or may be formed without perforating a collar member and that various changes may be made in the form thereof without departing from the spirit and scope of the invention, or affecting the operative character thereof. The internal collar member 8 is designed to be loosely received within the centrally apertured collar portion 20 of the outer cap member 3 which is provided at its upper end with an overhanging flange portion 14 against which the upper surface of the gasket or packing member 10 is compressed when the inner collar member has been placed in position. The apertured collar portion of the cap 3 is further provided with an annular groove 25 and a plurality of internal notches, or recesses 15 of any desired number and which, as clearly illustrated in Fig. 2, are formed with a shoulder or projection 16 at one end, the other end of said recess merging into the inner wall of the annular groove 25 in the wall of the aperture in the outer cap member. The annular groove 25 and the recesses 15 are disposed so as to be opposite the circumferential groove 11 of the internal collar member 8 when parts are assembled. A locking ring 17, preferably of spring steel, is formed of a size sufficient to normally extend part way into the recess 11 and part way into the groove 25 and is adapted to be expanded or contracted to be yieldably contained in either the recess 11 or the groove 25 to enable the same to be snapped into place first within the annular recess 11 of the internal collar member and then within the annular groove 25. One end of said split ring is offset, or projected outwardly as at 18 and the other end is offset or projected inwardly as at 19. The outwardly extending projections 18 are adapted to cooperate with a projection 16 in a recess 15 in the outer collar member and the inward projection 19 is designed to cooperate with the abutments 24 in the inner wall of the annular recess 11 of the internal collar member (Fig. 2).

In assembling the parts, the locking ring 17 is snapped or sprung into place within the circumferential groove 11 of the collar 8 and the ring is compressed to enable the same and the internal collar to be slipped within the central aperture of the outer cap 3. The internal collar is pressed into the outer cap member until the ring 17 snaps into the annular groove 25 and turned until the projection 18 engages one of the notched recesses 15 in the outer cap, after which the entire assembly is enabled by this locking engagement to be screwed onto the neck of the radiator. The engagement of the projection 19 with one of the abutments 24 and the corresponding engagement of the projection 18 with one of the projections 16 permits the internal collar, or adapter and the outer cap member to be screwed into place as a single unit. Thereafter, should it be attempted to unscrew the cap, the recesses 15 will ride freely over the projection 18. There being no resultant movement of the locking ring 17, the internal collar member 8 cannot be unscrewed from its threaded position on the radiator neck. It will, therefore, be apparent that the locking ring 17 provides a positive and permanent locking means which effectually prevents the unauthorized removal of the radiator cap, and after the cap has been screwed home, a special tool must be utilized to again effect the removal of the cap from the radiator.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. The combination of a collar member having means for attachment to the radiator neck and having a circumferential groove provided with an abutment, a cap adapted to loosely fit over said collar member and having an annular groove and an internal recess arranged to oppose the annular groove in said internal collar member, and means contained in said grooves and cooperating with said abutment and said recess to permit relative turning movement of said cap and said collar in one direction only.

2. The combination of an internal collar having means for attachment to a radiator neck and having a circumferential groove and abutments in said groove, a centrally apertured cap member having an internal annular groove and shoulders in said groove and adapted to fit loosely over said internal collar member, said internal annular groove being substantially opposite said circumferential groove when the parts are assembled, and resilient locking means disposed in said grooves and cooperating with the abutments in said circumferential groove and the shoulders in said annular groove for preventing relative turning movement of said cap and said collar in one direction and permitting relative movement of said member in the opposite direction.

3. The combination of an internal collar member having means for attachment to a radiator neck and having a circumferential groove provided with a plurality of abutments on the inner wall thereof, a cap member adapted to loosely fit over said internal collar member and having an annular groove and a plurality of internal recesses in said groove, said annular groove being arranged opposite the circumferential groove in said internal collar member, and resilient locking means loosely fitting in said annular groove and cooperating with said abutments and said recesses to prevent relative turning movement of said cap member and said collar member in one direction and permit relative turning movement of said members in the opposite direction.

4. The combination of an internal collar having means for attachment to a radiator neck and having a circumferential groove, a centrally apertured cap member having an annular groove and adapted to loosely fit over said internal collar member, said annular groove being substantially opposite said circumferential groove when the parts are assembled, an abutment in said circumferential groove, a shoulder in said annular groove, and a split locking ring adapted to extend into said circumferential groove and said annular groove to maintain said cap and said collar member in assembled relation, one end of said split ring being offset outwardly to engage the shoulder in said annular groove, and the other end of said split ring being offset inwardly to engage the abutment in said circumferential groove whereby simultaneous turning movement of said cap and collar member is permitted in one direction only.

5. The combination of an internal collar member having screw-threaded means for attachment to a radiator neck and having a circumferential groove provided with an abutment on the inner wall thereof, a cap adapted to loosely fit over said internal collar member and having an annular groove arranged to oppose the circumferential groove in said internal collar member when said cap and said collar member are in assembled relation, a shoulder in said annular groove, and a split locking ring adapted to extend into said annular groove and said circumferential groove and to cooperate therewith to prevent relative axial movement thereof and to cooperate with said abutment in said circumferential groove and said shoulder in said annular groove to prevent relative turning movement of said cap member and said collar member in one direction and permit relative turning movement of said members in the opposite direction.

6. The combination of an internal collar member having screw-threaded means for attachment to a radiator neck and having a circumferential groove with an abutment formed therein, a centrally apertured cap member having an annular groove disposed in said aperture and said cap being adapted to loosely fit over said internal collar member, said cap member having a shoulder formed in said groove, said annular groove being substantially opposite said circumferential groove when the parts are assembled, and a split locking ring having parts thereof disposed in said circumferential groove and annular groove, said split locking ring having oppositely projecting offset ends adapted to engage the shoulder of said cap member and the abutment in said annular groove of said collar member, to prevent relative turning movement of said cap and collar members in one direction and permit said relative turning movement in the opposite direction.

7. The combination of a collar member having means for attachment to a radiator neck and having a circumferential groove, a cap adapted to loosely fit over said collar member and having an annular groove arranged to oppose the circumferential groove in said internal collar member, a shoulder in said annular groove, an abutment in said circumferential groove, and a ring seated in said circumferential groove and extending into said annular groove upon assembly to prevent relative axial movement of said collar member and said cap and adapted to cooperate with said shoulder in said cap and said abutment in said collar to permit relative turning movement thereof in one direction only.

8. The combination of a collar member having means for attachment to a radiator neck and having a circumferential groove, a cap adapted to loosely fit over said collar member and having an annular groove arranged to oppose the circumferential groove in said internal collar member, an annulus having an opening on the periphery thereof providing radial inwardly and outwardly extending opposed detents seated in said circumferential groove and adapted to extend into said annular groove upon assembly to prevent relative axial movement of said collar and said cap, said annular groove and said circumferential groove having engageable parts therein co-operating with the opposed detents of said annulus to prevent relative turning movement of said cap and said collar in one direction only.

ALOYSIUS C. LIPPERT.